United States Patent
Hsu et al.

(10) Patent No.: US 11,756,264 B2
(45) Date of Patent: Sep. 12, 2023

(54) CONTINUOUS OPTIMIZATION OF DISCRETE PARAMETERS USING A UNIFIED STRESS INDICATOR

(71) Applicant: Adobe Inc., San Jose, CA (US)

(72) Inventors: Chi Cheng Hsu, Salt Lake City, UT (US); Michal Lukác, Boulder Creek, CA (US); Michael Gharbi, San Francisco, CA (US); Kevin Wampler, Seattle, WA (US)

(73) Assignee: Adobe Inc., San Jose, CA (US)

( * ) Notice: Subject to any disclaimer, the term of this patent is extended or adjusted under 35 U.S.C. 154(b) by 27 days.

(21) Appl. No.: 17/534,225

(22) Filed: Nov. 23, 2021

(65) Prior Publication Data

US 2023/0162443 A1    May 25, 2023

(51) Int. Cl.
*G06T 17/20* (2006.01)
*G06T 11/20* (2006.01)

(52) U.S. Cl.
CPC ............ *G06T 17/20* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 11,087,511 B1* | 8/2021 | Vallespi | G06T 11/00 |
| 2004/0017393 A1* | 1/2004 | Easwar | G06F 16/51 |
| | | | 707/E17.031 |
| 2008/0278479 A1* | 11/2008 | Sun | G06T 17/20 |
| | | | 345/419 |
| 2019/0259216 A1* | 8/2019 | Gambaretto | G06T 19/20 |

* cited by examiner

*Primary Examiner* — Sultana M Zalalee
(74) *Attorney, Agent, or Firm* — Nicholson De Vos Webster & Elliott LLP

(57) ABSTRACT

Embodiments are disclosed for receiving a target shape. The method may further include initializing a gradient mesh to a vector graphic having at least one node. The method may further include performing a constrained optimization of the vector graphic based on the target shape. The method may further include generating a stress metric based on a comparison of the constrained optimization and the target shape. The method may further include determining one or more unconstrained candidate vector graphics based on the stress metric. The method may further include selecting an improved vector graphic from the one or more unconstrained candidate vector graphics. The method may further include mapping the vector graphic to the improved vector graphic. The method may further include optimizing the improved vector graphic based on the target shape.

20 Claims, 12 Drawing Sheets
(6 of 12 Drawing Sheet(s) Filed in Color)

CONTINUOUS OPTIMIZATION OF DISCRETE PARAMETERS USING A UNIFIED STRESS INDICATOR

BACKGROUND

Gradient-based optimization and differentiable vector rasterization technology makes it possible to change the properties of vector graphics to better match an objective function. For example, local heuristic-based optimizers and gradient-based optimizers have been applied to vector graphics. Local heuristic-based optimizers only require the ability to evaluate the objective for any given configuration, while gradient-based optimizers, which are more performant, require knowledge of the gradient of the objective for a set configuration with respect to graphic parameters. The local heuristic optimizers lack any notion of gradient and are not able to process high-dimensional spaces. Unfortunately, the gradient-based optimizers cannot be used to perform discrete changes: it is only possible to compute and back-propagate gradients with respect to existing parameters, which makes it impossible to optimize over reparameterizations. This leads to a number of problems in practice where such optimizers are used. For example, an image trace function may be implemented using such optimizers, however it relies on the parameters provided by a user, typically through trial and error. Similarly, tools that convert image masks into vector masks rely on handcrafted heuristics to guess the number of parameters needed to perform the conversion. In both instances, trial and error and the use of heuristics both require time and knowledge of the user and still may not be able to identify an adequate or "best" optimization to a given problem.

SUMMARY

Introduced here are techniques/technologies that relate to optimizing complex paths using a vector graphic by computing a stress parameter and determining whether an additional degree of freedom can improve the representation of a target function by the vector graphic. A graphics application can receive a target function such as a raster image and initialize a vector graphic to represent the target function. The graphics application can perform an optimization process for the gradient mesh. The graphics application can generate a stress metric for a proposed reparameterization of a vector graphic, a modified vector graphic that includes one or more additional parameters, such as nodes, gradient stops, and the like. The graphics application can compare the stress metrics of the gradient mesh and the modified gradient mesh. The graphics application can determine, based on the comparison, whether the gradient mesh or the modified gradient mesh more accurately represents the target function.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

Figure 1:
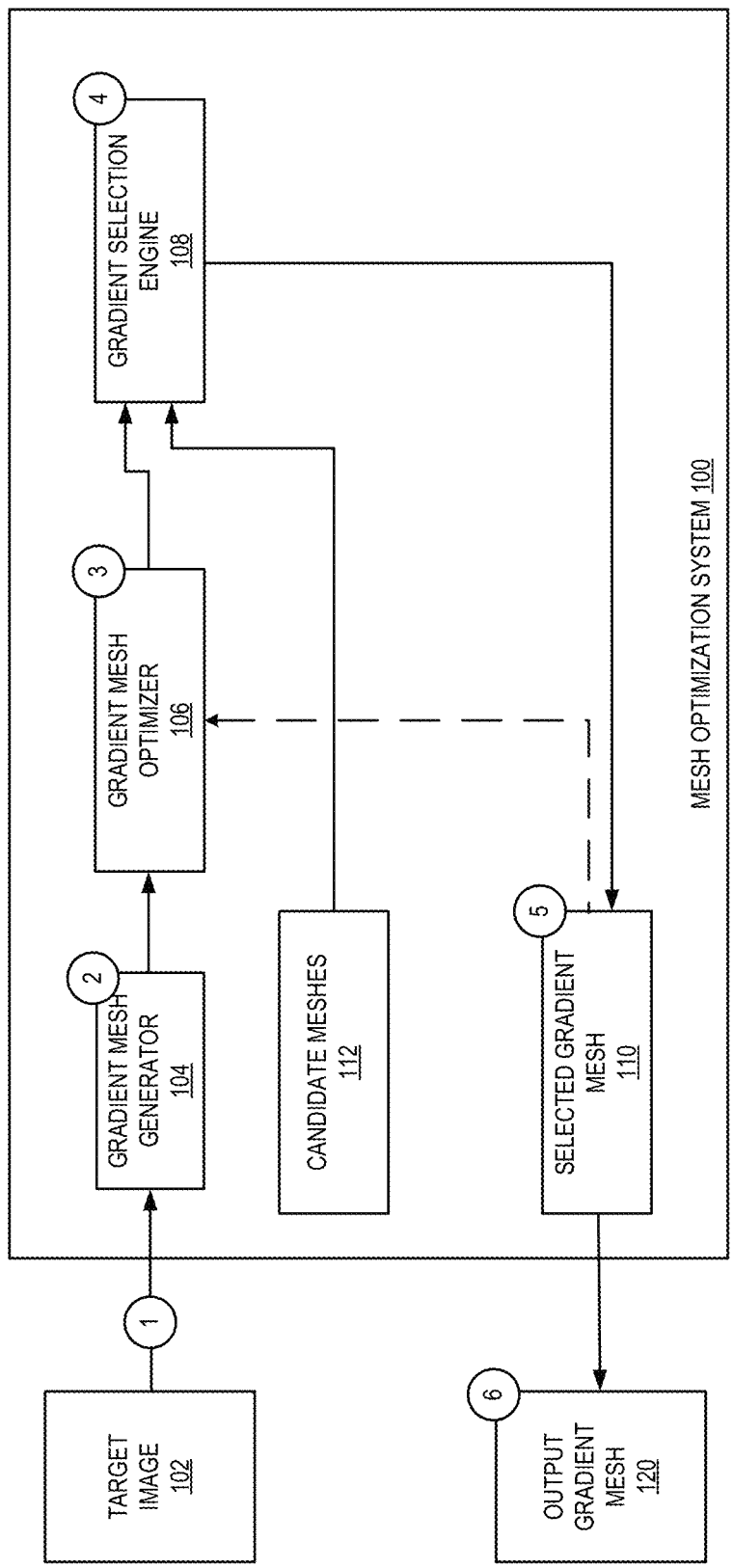
FIG. 1 illustrates a diagram of a process of continuous optimization of discrete parameters in accordance with one or more embodiments.

One or more embodiments of the present disclosure include continuous optimization of discrete parameters using stress indicators. A mesh optimization system can receive a target image to be represented with a gradient mesh or vector graphic. The mesh optimization system can initialize a gradient mesh with at least one patch. In some embodiments, a gradient mesh comprises a patch that includes four nodes. The mesh optimization system performs an optimization of the gradient mesh to satisfy a loss function. The mesh optimization system can compute a stress metric that is based on conceptualizing the gradient mesh and objective as a physical system with potential energy, kinetic energy, and other physical properties. The mesh optimization system and determine whether to add one or more additional nodes to the gradient mesh. For example, the mesh optimization system can determine that the gradient mesh would more accurately approach the target image when one or more additional nodes are added to the gradient mesh. The mesh optimization system can compare the stress metric of the gradient mesh and a stress metric of a modified gradient mesh with the one or more additional nodes. The mesh optimization system can select the gradient mesh or the modified gradient mesh that more closely represents the target image (i.e., the gradient mesh with the lowest stress).

In contrast, conventional systems typically use specifically crafted heuristics for the optimization of each target image. However, such heuristics often suffer from a lack of flexibility and aspects of arbitrary decision making. The techniques of the present disclosure provide a consistent model for use in discrete parameter operations on a gradient mesh. Local heuristic optimizers often explore the space near the current configuration changing both continuous parameters and discrete parameters, but they are not able to guarantee a descent direction and thus are inefficient and not suitable for high-dimensional spaces such as shapes with many control points. The gradient-based optimizers in conventional systems operate only on gradients defined with respect to continuous parameters and cannot be used to perform discrete operations, such as reparameterization.

As discussed, conventional techniques lack the ability to perform discrete operations, such as Bezier curve splitting, due to the inability to mathematically differentiate the discrete operation and therefore lack a gradient information to guide the optimization. As a result, conventional systems require complex heuristics that suffer from randomness and inextensibility to other discrete operations. This reduces the utility of using discrete operations for optimizations that involve splitting Bezier curves or other discrete operations that are not differentiable. Some examples of discrete operations may include splitting a curve, adding one or more nodes to an initial gradient mesh to generate an improved gradient mesh, or other operations.

To address these and other deficiencies in conventional systems, embodiments provide a consistent model of a gradient substitute for use with discrete parameters. Although embodiments are generally described with respect to a vector graphics application, embodiments can be used for any discrete operations in combination with a gradient optimization.

FIG. 1 illustrates a diagram of a process of continuous optimization with discrete parameters in accordance with one or more embodiments. As depicted in FIG. 1, a mesh optimization system 100 can receive a target image 102 at numeral 1. The target image 102 can be a vector graphic. For example, as used herein, the term "vector graphic" refers to any digital image, or series of images. For example, the term "vector graphic" includes digital files with the following, or other, file extensions: .SVG, .DXF, .EPS, or .PDF. The term "vector graphics" also includes two or more vector graphics (e.g., frames) in a digital video. Accordingly, although much of the description herein is phrased in terms of a single vector graphic image, it will be appreciated that the disclosure can apply to representing groups of vector graphics (e.g., applying continuous optimization of discrete parameters to each vector graphic in the group and outputting the group).

A mesh optimization system 100 can include a gradient mesh generator, gradient mesh optimizer, and a gradient selection engine. While FIG. 1 describes these as distinct software, this is merely for explanatory purposes and any of these components can be integrated into any of the other components. While the mesh optimization system 100 is described as a software application, an alternative implementation includes specialized hardware or a combination of software and specialized hardware.

In some embodiments, a user can provide a target image 102, at numeral 1, from an image store (e.g., on their device, such as a camera roll, file system, or application, etc., or from a storage service, such as a remote file system, cloud-based storage service, etc.) or captured by a camera. The target image can be a vector graphic. A mesh optimization system 100 can receive the target image and initialize a gradient mesh to represent the target image 102.

For example, at numeral 2, the mesh optimization module may generate an initial gradient mesh with gradient mesh generator 104. The gradient mesh generator 104 can create the initial gradient mesh that is a mesh object with a regular pattern of one or more patches. In one example, the gradient mesh generator creates an initial gradient mesh by distributing at least one patch over the target image such that a mesh of patches is created. In some embodiments, a patch is defined by a boundary of nodes and one or more lines or curves between each node. An example of the gradient mesh is a representation of a target image that can be a multicolored object that includes colors that flow in different directions and transition smoothly from across the multicolored object. The gradient mesh can include one or more lines called mesh lines that can span the gradient mesh. The one or more mesh lines provide additional points between nodes that allow for multi-directional changes in color for meshes with multiple nodes. Examples of nodes are a color stop in the gradient mesh or a control point of a Bezier curve. The mesh optimization module can reposition or add additional nodes along the mesh lines to change the intensity of a color shift or change the extent of a colored area on the object. An area defined by a boundary between any four nodes can be called a mesh patch. The mesh optimization module can change the color of the mesh patch using the same techniques as changing attributes of a single node. Additional detail on manipulating nodes is described at least with regard to FIGS. 2-12.

At numeral 3, a gradient mesh optimizer 106 can perform one or more optimization processes to the gradient mesh to satisfy a loss function. The gradient mesh optimizer 106 can use any form of gradient descent to perform an optimization process. For example, the gradient mesh optimizer 106 can optimize the gradient mesh by minimizing a pixel difference between the initial gradient mesh and the corresponding raster-based target image. In one implementation, the difference between the initial gradient mesh and the corresponding raster-based image can be used to measure a similarity between the initial gradient mesh and the raster-based image.

The mesh optimization system 100 can include a gradient selection engine 108. For instance, at numeral 4, the gradient selection engine 108 can compute a stress metric for the output of the gradient mesh optimizer ("optimized gradient mesh") and a number of candidate meshes 112. An example of the optimized gradient mesh is the mesh optimized with a continuous gradient update, before the discrete operation. An example of a candidate mesh is a mesh with a different number of nodes than the original gradient mesh. The mesh optimization system 100 can store multiple candidate meshes 112 that have various quantities of nodes and positions. In one example, the gradient selection engine can compare the stress in the optimized gradient mesh and in each of the candidate meshes 112. The gradient selection engine can determine the stress of the candidate meshes 112 and select a candidate mesh that has a stress metric lower than the stress metric of the optimized gradient mesh. In some examples, the gradient selection engine 108 can select the optimized gradient mesh or the candidate mesh based on a comparison of the respective stress metrics. The gradient selection engine can output a selected gradient mesh 110. It will be appreciated that the gradient selection engine computes the stress as a unified metric to compare gradient meshes that have different numbers of nodes, which have different parameterizations. Additional details on this comparison and computing stress metric are discussed elsewhere herein, at least in the detailed mathematical discussion.

At numeral 5, the mesh optimization system 100 may iteratively perform optimization and selection operations.

The mesh optimization system 100 may perform an optimization of the selected gradient mesh 110 by inputting the selected gradient mesh 110 into the gradient mesh optimizer 106. The mesh optimization system 100 can further process the output of the gradient mesh optimizer through the gradient selection engine 108 with additional candidate meshes 112. The mesh optimization system 100 may output an output gradient mesh 120. At numeral 6, the mesh optimization system 100 can determine that the stress of the selected gradient mesh 110 has a stress metric that is less than a threshold stress.

Figure 2:
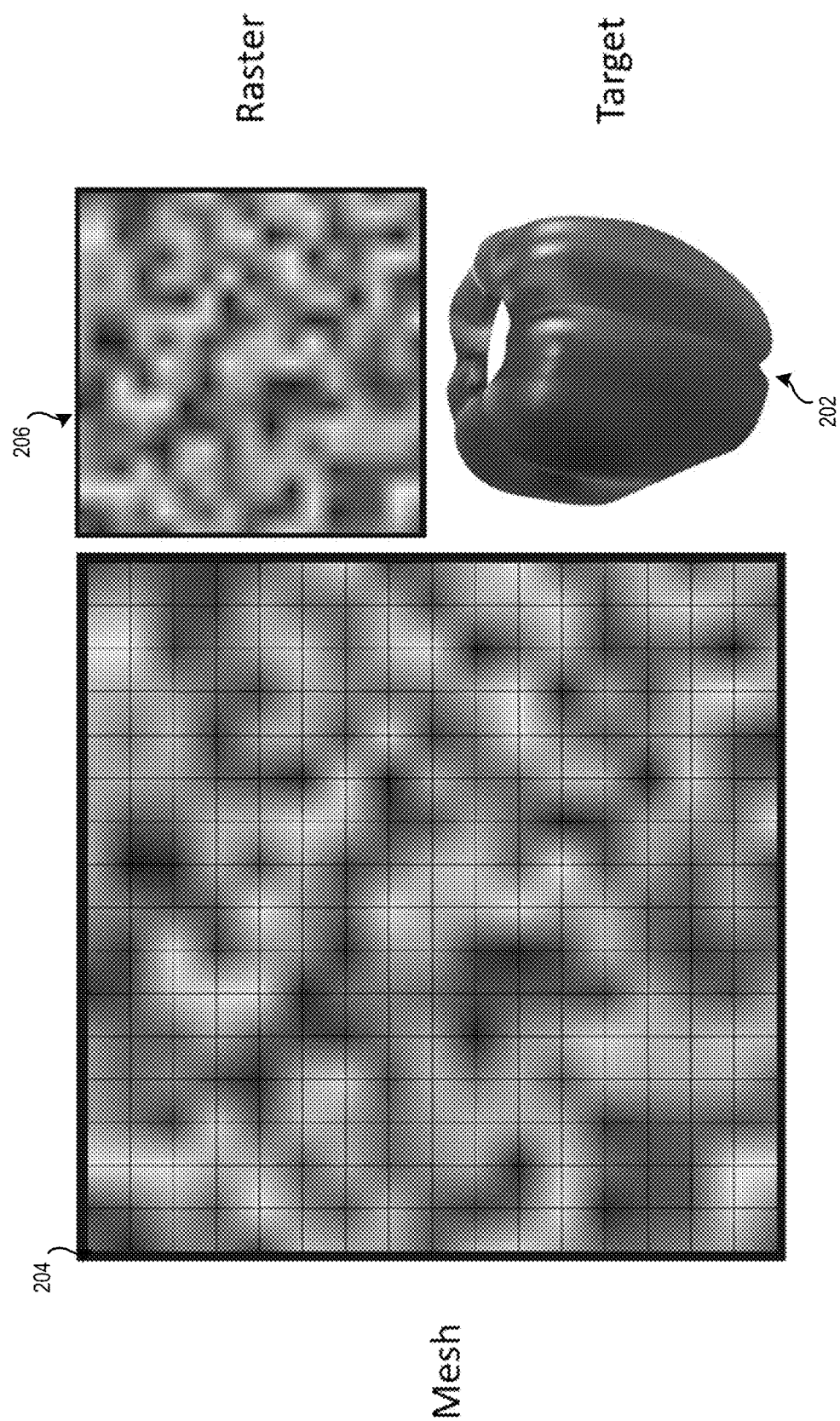
FIG. 2 illustrates an example of an initial gradient mesh, a raster, and a target image in accordance with one or more embodiments.
Figure 3:
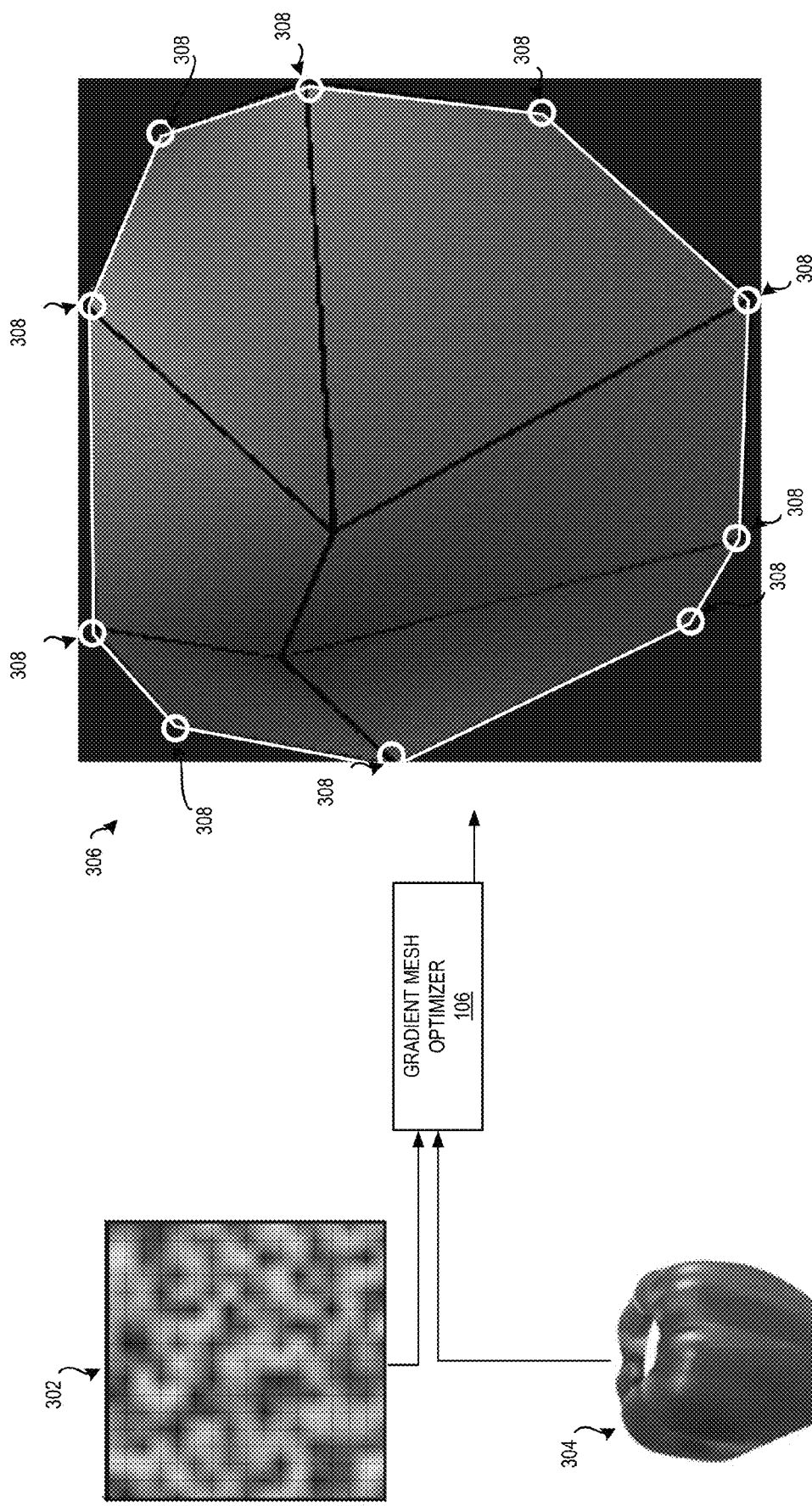
FIG. 3 illustrates an example of an optimized gradient mesh in accordance with one or more embodiments.

FIG. 2 illustrates an example of an initial gradient mesh, a raster image, and a target image in accordance with one or more embodiments. For instance, the mesh optimization module can receive a target image 202. The target image may include a raster image comprising a plurality of pixels. The mesh optimization system 100 may generate a raster image 206. An example of the raster image 206 is a bitmap image that includes a grid of pixels that is presentable on a user interface, such as by a computer display. In some embodiments, the raster image 206 can be defined by a pixel width and pixel height of the raster image and a bit depth for each pixel. The mesh optimization module can use a gradient mesh generator to create the initial gradient mesh 204. As illustrated in FIG. 2, the initial gradient mesh can include a grid of a plurality of colors such as a randomized or pre-determined distribution of colors. In the example shown in FIG. 2, each node can be assigned a random color stop. In some embodiments, the initial gradient mesh can be a mesh with one node and a single color. After the initial gradient mesh is generated, the mesh optimization module performs an optimization on the initial gradient mesh as shown in FIG. 3. While aspects of the present disclosure are described with regard to a raster image and a gradient mesh, it should be appreciated that generating gradient meshes is one example. Another example may be tracing a binary vector mask to "rotoscope" an image or video. In the tracing a binary vector mask example, the same technology can be used to track discrete changes in the mask's contour (e.g., number of control points, etc.).

FIG. 3 illustrates an example of a process for optimizing an initial gradient mesh in accordance with one or more embodiments. The gradient mesh optimizer performs an optimization process on the initial gradient mesh. The gradient mesh optimizer adjusts one or more nodes, colors, brightness, or visual characteristics of the initial gradient mesh. In this example, the optimized gradient mesh includes two nodes within the bounds of the shape of the mesh. As compared with the initial gradient mesh depicted in FIG. 2, the optimized gradient mesh more closely represents the target image. For instance, the optimized gradient mesh has a color distribution that approximates the target image and the shape of the optimized gradient mesh (i.e., the boundary nodes 308 along the white outline) more accurately reflects the shape of the target image. Additional details are described at least with regard to FIG. 9.

As illustrated by FIG. 3, the initial gradient mesh 302 and the target image 304 can be received by the gradient mesh optimizer 106. The gradient mesh optimizer 106 can compute, using a loss function, an optimized gradient mesh including a predetermined quantity of nodes. The gradient mesh optimizer 106 can adjust the position of the nodes or attributes of the nodes, such as a color, to better represent the target image 304. The gradient mesh optimizer 106 can output an optimized gradient mesh 306 to the gradient selection engine. As shown in FIG. 3, the optimized gradient mesh has two color stops and a plurality of control points that defines a boundary of the shape. As discussed above, the gradient mesh optimizer can adjust positions of color stops and the control points to minimize the difference between the target image and the optimized gradient mesh. Additional details about computing the optimized mesh are discussed below.

Figure 4:
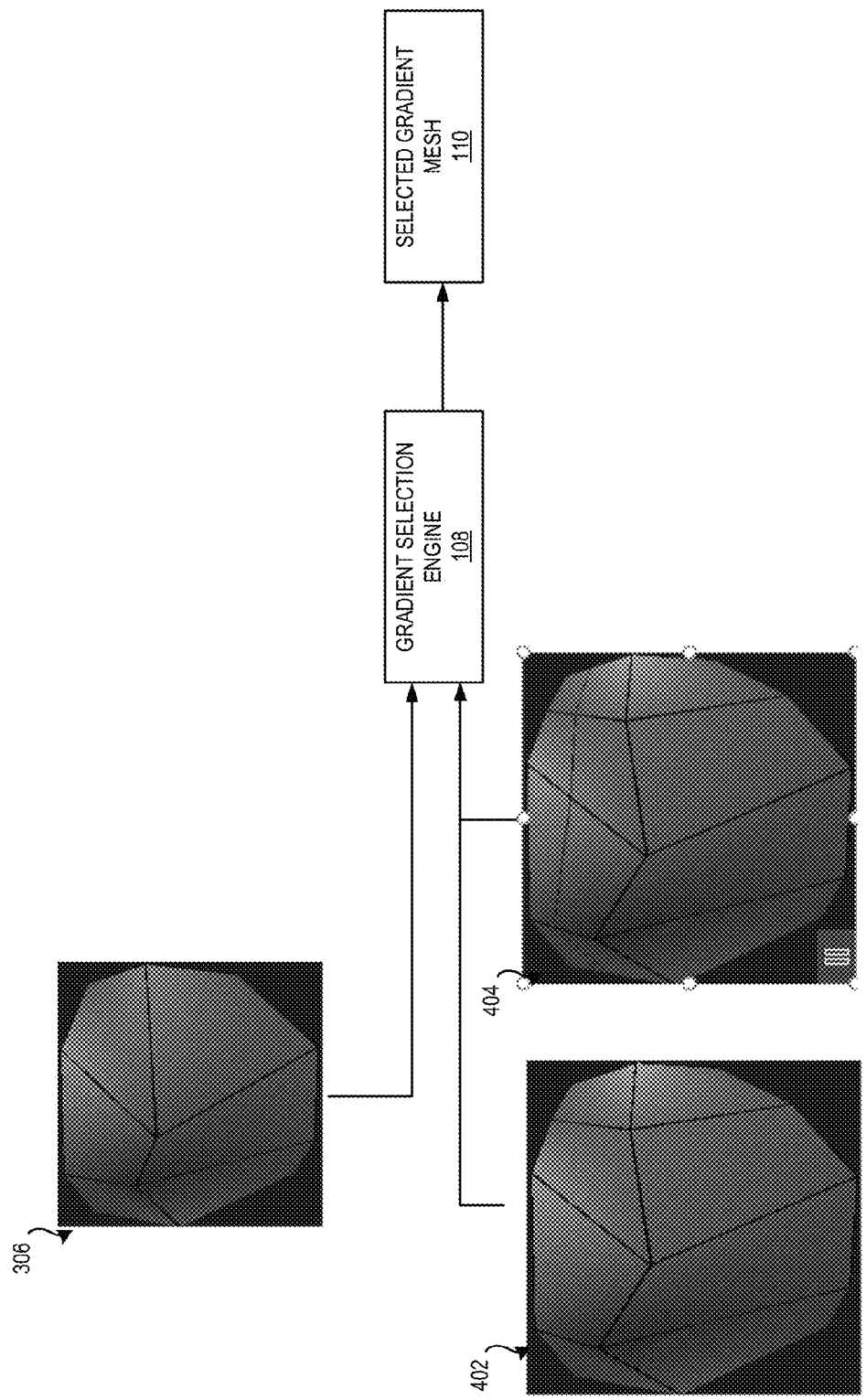
FIG. 4 illustrates an example of a candidate gradient mesh in accordance with one or more embodiments.

FIG. 4 illustrates an example of a process for selecting a gradient mesh in accordance with one or more embodiments. In this example, the gradient selection engine 108 receives the optimized gradient mesh and one or more candidate gradient meshes. The gradient selection engine 108 can receive multiple candidate meshes that each have a different number of nodes than the optimized gradient mesh. In this example, the gradient selection engine 108 receives the optimized gradient mesh 306, a first candidate mesh 402, and a second candidate mesh 404. The first candidate mesh 402 and the second candidate mesh 404 ("candidate meshes") can also have a unique number of nodes among other candidate gradient meshes. As illustrated by FIG. 4, the first candidate mesh 402 has a fewer number of nodes as compared with the second candidate mesh 404. The gradient selection engine can perform a comparison between the optimized gradient mesh and the target image and each candidate gradient mesh and the target image. The gradient selection engine selects the optimized gradient mesh or one of the candidate meshes that more closely represents the target image. In one example, one of the candidate meshes more accurately depicts the coloration of the target image and is selected by the gradient selection engine. As described elsewhere herein, the gradient selection engine compares the optimized gradient mesh and the candidate meshes (the candidate meshes often comprise varying quantities of nodes) using a constrained model and unconstrained model. This allows these conventionally incomparable gradient meshes to be compared.

In some embodiments, the gradient selection engine can perform iterative selections by comparing the optimized gradient mesh with multiple candidate meshes 112, perform a selection of a selected gradient mesh from the optimized gradient mesh or multiple candidate meshes 112. The mesh optimization module may perform additional optimizations on the selected gradient mesh and the gradient selection mesh may perform a selection of an optimized selected gradient mesh and multiple candidate gradient meshes. This iterative selection can be performed any number of times until a desired characteristic is met to output the selected gradient mesh. In one example, a desired characteristic may be a threshold stress metric that indicates a similarity of the selected gradient mesh to the target image. In other examples, the module optimization module can compare a change in stress metric, or another relationship between the stress metric of the optimized gradient mesh and the candidate gradient meshes.

Figure 5:
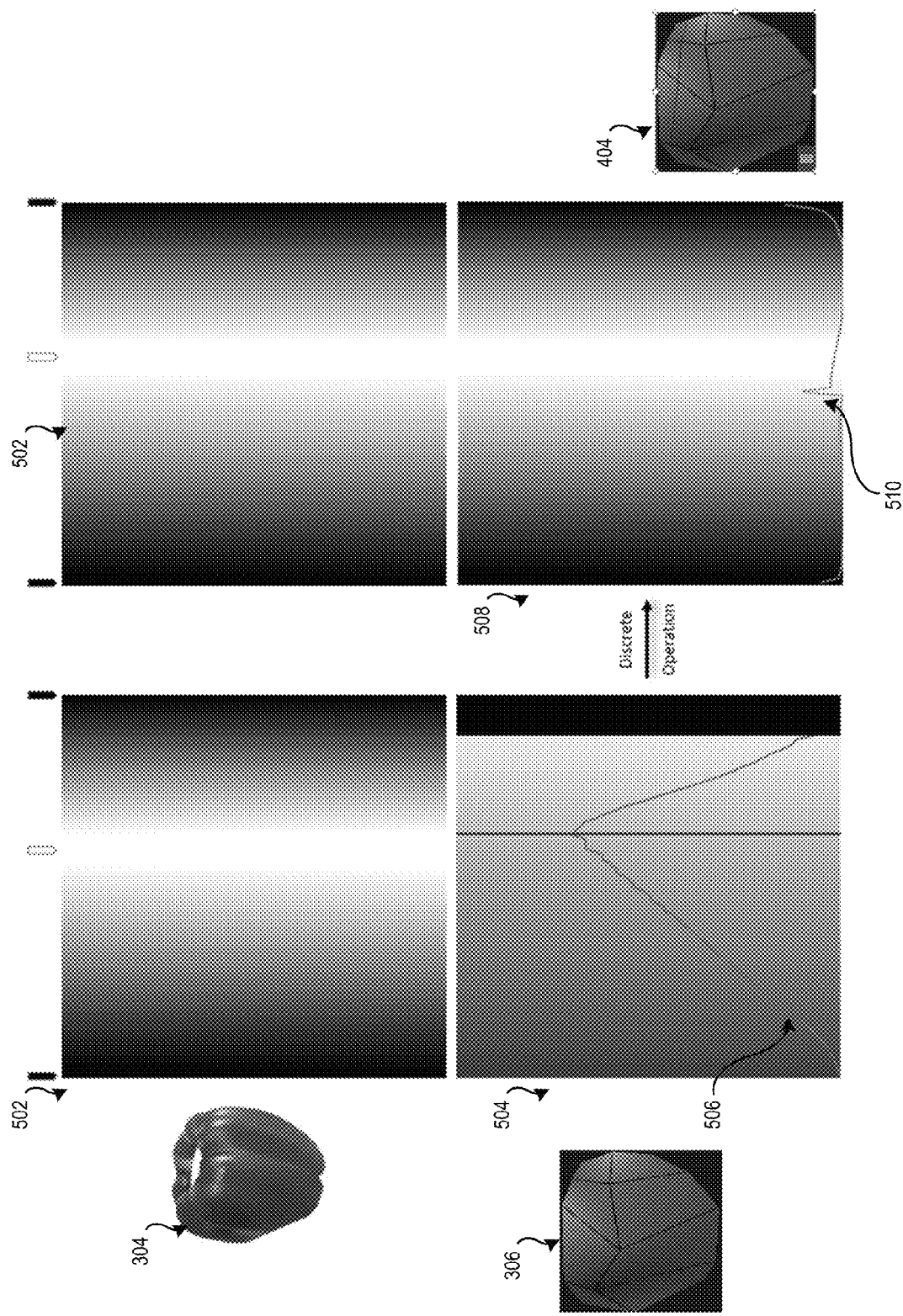
FIG. 5 illustrates an example of computing a stress metric before and after a discrete operation in accordance with one or more embodiments.

FIG. 5 illustrates an example of computing a stress metric before and after a discrete operation in accordance with one or more embodiments. The mesh optimization module can compute a stress metric for the optimized gradient mesh and another stress for the candidate gradient mesh. As described above, the mesh optimization module can compute a stress metric for a gradient mesh. As illustrated in FIG. 5, the target gradient 502 (i.e., from the target image 304) can be compared with the optimized gradient 504 (such as from optimized gradient mesh 306). In some embodiments, the mesh optimization module computes the stress metric of the optimized gradient 504 as a maximum value of the first curve 506.

As further illustrated in FIG. 5, an improved gradient 508 (such as represented by one of candidate meshes of FIG. 4) depicts a gradient after a discrete operation is applied to the optimized gradient 504. As shown in FIG. 5, the stress metric of the improved gradient can be computed as a maximum value of a second curve 510 that represents the stress metric across the improved gradient 508. In this example, the discrete operation (e.g., adding an additional color stop in the gradient mesh) reduced the stress metric and also the appearance of improved gradient 508 more closely represents the target gradient 502.

Figure 6:
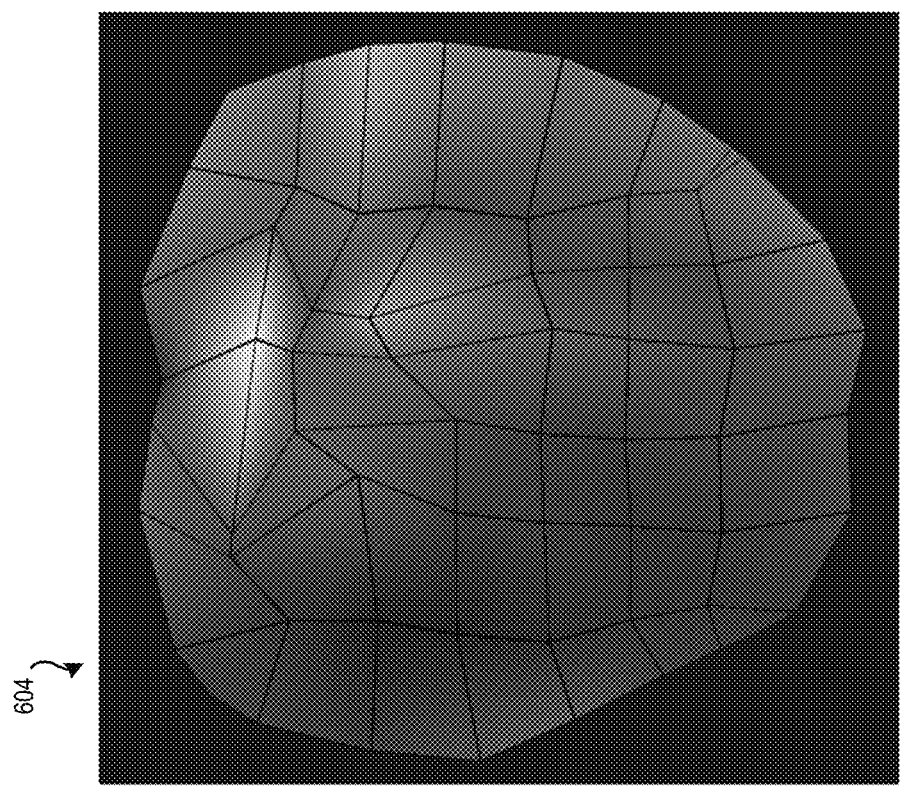
FIG. 6 illustrates an example of a process of comparison between an optimized gradient mesh and a candidate gradient mesh in accordance with one or more embodiments.
Figure 6:
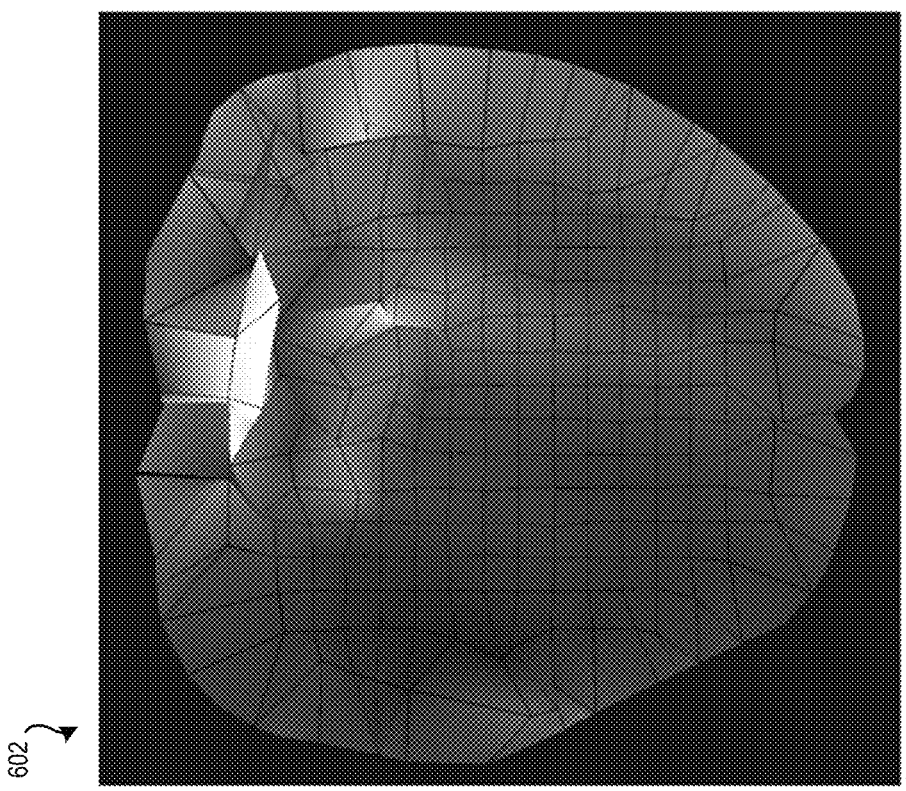

FIG. 6 illustrates an example of different outputs of the gradient mesh optimizer in accordance with one or more embodiments. As illustrated in FIG. 6, a first output mesh 602 can be described as a fine mesh. As illustrated in FIG. 6, the second output mesh 604 can be described as a coarse mesh. The mesh optimization module, by applying the process of mesh optimization and discrete operations (e.g., changing the number of nodes in a particular mesh) can discriminate between the first output mesh 602 and second output mesh 604 to determine which gradient mesh is the more accurate representation of the target image. The unified stress metric that can be computed for the first output mesh 602 and the second output mesh 604 provides a novel means of determining when performing a discrete operation to a gradient mesh will improve the gradient mesh. In some examples, the mesh optimization system may determine a fine mesh or a coarse mesh to output based on a type of device or computing resources that can generate the gradient mesh. For instance, the mesh optimization system can determine that a coarse mesh can be output for an edge computing device, a mobile electronic device, or the like. In another example, the mesh optimization system can determine that a fine mesh can be output for a cloud computing system, a personal computing device, or the like. In some embodiments, meshes can be initialized with varying number of nodes. In some cases, initializing a mesh with a greater number of nodes enables more detailed color gradients, but can be inefficient as some areas of the image do not require such a high density of control points to represent the color accurately. As disclosed herein, the mesh optimization module can use a parsimonious allocation of control points that is optimized to represent the target image. The mesh optimization module using fewer control points can be a desirable property for a gradient mesh as it can simplify further editing by a user.

Figure 7:
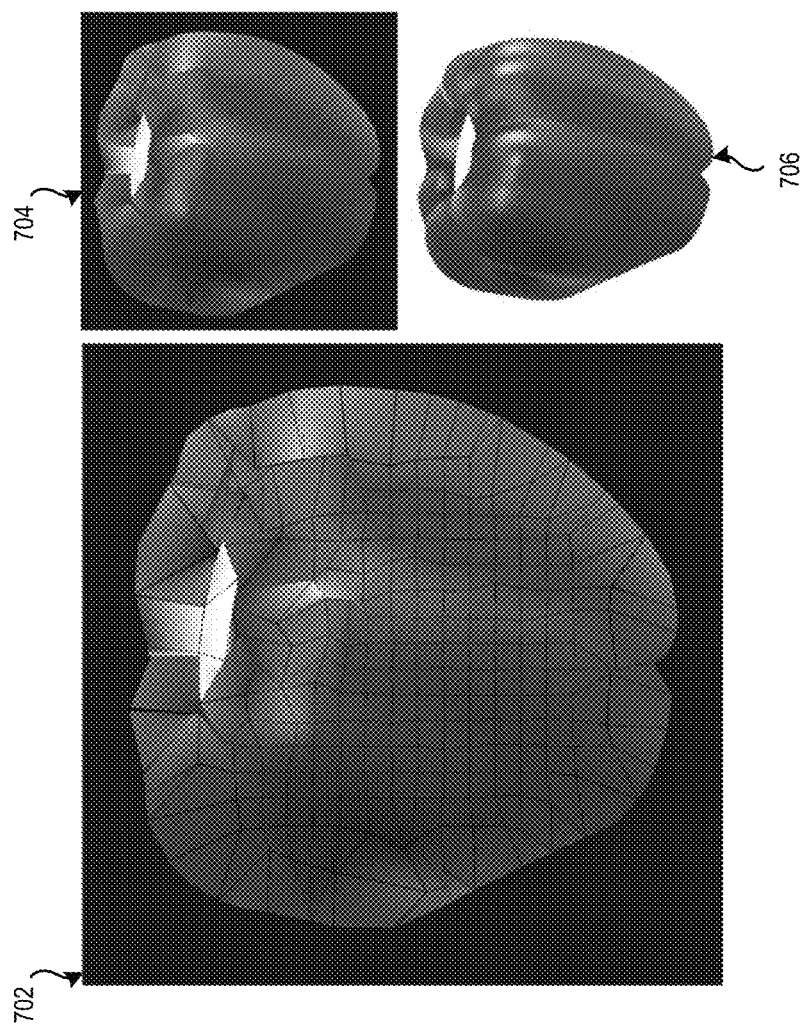
FIG. 7 illustrates an output gradient mesh in accordance with one or more embodiments.

FIG. 7 illustrates an output gradient mesh in accordance with one or more embodiments. As described above, the mesh optimization module can perform any number of iterative optimization and selection operations. The mesh optimization module can terminate the iterative optimization and selection operations as described above. The mesh optimization module outputs a refined mesh, such as output mesh including a wireframe 702. The mesh optimization module may present the output mesh including the wireframe 702 via a user interface. In some cases, the mesh optimization module may present the output mesh including the wireframe 702, an output mesh without a wireframe 704, and the target image 706. In some embodiments, the target image 706 may be received from a user and the mesh optimization module can generate the output mesh including the wireframe 702 and the output mesh without the wireframe 704. While the output mesh including the wireframe 702 and the output mesh without the wireframe 704 are shown, either one may be presented to the user via the user interface.

Figure 8:
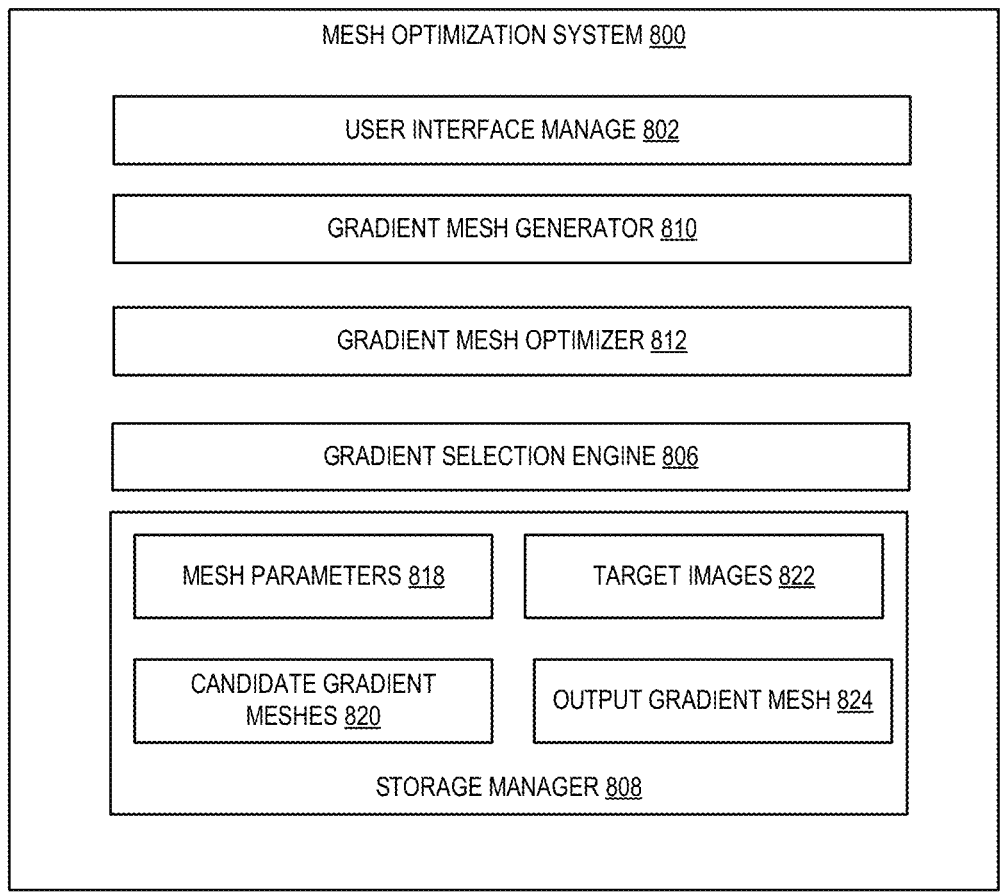
FIG. 8 illustrates a schematic diagram of mesh optimization system in accordance with one or more embodiments.

FIG. 8 illustrates a schematic diagram of mesh optimization system 800 in accordance with one or more embodiments. As shown, mesh optimization system 800 may include, but is not limited to, a user interface manager 802, a gradient mesh generator 810, gradient mesh optimizer 812, gradient selection engine 806, and storage manager 808. The storage manager 808 includes mesh parameters 818, candidate gradient meshes 820, target images 822, and output gradient mesh 824.

As illustrated in FIG. 8, the mesh optimization system 800 includes a user interface manager 802. For example, the user interface manager 802 allows users to select a target image to be processed by the mesh optimization system. In some embodiments, the user interface manager 802 enables a user to select one or more files which include target images 822 and are stored or accessible by storage manager 808. In some embodiments, the user interface manager 802 enables the user to select specific target image from target images 822. This may be provided through the graphical user interface of a digital design application, as a standalone design management application, or other application.

As illustrated in FIG. 8, the mesh optimization system 800 includes a gradient mesh generator 810. The gradient mesh generator 810 can generate an initial gradient mesh to represent the target image. For example, when the mesh optimization system 800 receives a target image, such as from a user selection, the gradient mesh generator 810 generates the initial gradient by creating a gradient mesh with one or more patches. The gradient mesh generator may be a graphics application that generates an initial gradient mesh with at least one patch over a target image region.

As illustrated in FIG. 8, the mesh optimization system 800 includes a gradient mesh optimizer 812. The gradient mesh optimizer 812 may modify the initial gradient mesh to satisfy a loss function. For example, the gradient mesh optimizer 812 optimizes the initial gradient mesh by modifying the locations, attributes, or lines for the initial gradient mesh.

In a non-limiting example, an arbitrary path may be defined as a map, $P_\theta$: $(t \in (0,1)) \rightarrow R^2$, the path can be optimized by a path optimizer to satisfy a given loss function, such as $\mathcal{L}(P_\theta)$. In a case of gradient descent, a speed of convergence for determining when to apply a discrete operation can be approximated by the magnitude of the gradient, given by: $|\nabla_\theta \mathcal{L}(P)|$. In this example, $\theta$ is a set of parametrization parameters. The typical mathematical challenge arises when considering applying a discrete operation that changes the parameterization parameters such that $\theta$ exists in different representations before and after such each discrete operation and a pure comparison of the magnitudes is not comparable. As described herein, the systems and methods disclosed provide a process to compute a unified metric to account for the difference in representations before and after each discrete operation.

As illustrated in FIG. 8, the mesh optimization system 800 includes a gradient selection engine 806. The gradient selection engine 806 can compute a stress metric for the output of gradient mesh optimizer 812 and candidate gradient meshes 820 from the storage manager 808. For example, as discussed, the gradient selection engine 806 can evaluate one or more discrete operations (e.g., adjusting a number of nodes in a mesh) by computing the stress metric of the one or more candidates meshes 112 in comparison a stress metric for the output of gradient mesh optimizer.

In particular, the mesh optimization system 800 can unify the representations by modeling each vector graphic as a physical system for comparison by the gradient selection engine 806. The mesh optimization module can generate a potential energy in the form of a loss function and simulate a transference of the potential energy into kinetic energy. Applying the physical system modeling, the mesh optimization module can compute a rate of "acceleration" that represents the magnitude of the gradient and can be used with gradient meshes having different numbers of nodes. The physical system model can be a gradient descent optimizer acting on a potential energy. In physics, motion will always happen in the direction of maximum decrease of potential. Thus, the mesh optimization module can compare gradient meshes that are conventionally not comparable due to different representations.

More specifically, the physical modeling of the gradient mesh provides that a transfer of potential energy to kinetic energy, represented by T, can be represented by Lagrange's equation (with $\mathcal{L}(P_\theta)$ acting as the potential energy). Accordingly, a mathematical representation of the physical modeling for transference of potential to kinetic energy can be represented by $$\frac{\partial}{\partial s}\left(\frac{\partial \mathcal{L}}{\partial \dot\theta}\right) = \frac{\partial \mathcal{L}}{\partial \theta}.$$

Thus, the Lagrangian (e.g., a smooth real-value function) can be represented by $L=T-\mathcal{L}(P)$, and $$\dot\theta = \frac{\partial \theta}{\partial s}.$$

Evaluating and simplifying these functions results in a representation of $$\frac{\partial L}{\partial \theta} = -\nabla_\theta \mathcal{L}(P) = -\mathcal{L}'.$$

Applying this to a form of a b-spline, the left-hand side can be derived from the definition of kinetic energy resulting in $$T(\dot\theta) = \frac{1}{2}\int_t \dot\theta e(t)^T e(t) \dot\theta^T \left|\frac{dP(\theta)}{dt}\right| dt$$

with e(t) can be a b-spline basis. In this example, a b-spline basis can be any spline function is any number of flexible bands that pass-through control points. Taking the gradient of the above and rearranging terms, $$\nabla_{\dot\theta} T(\dot\theta) = M\dot\theta, \text{ and } \frac{\partial}{\partial s}\left(\frac{\partial L}{\partial \dot\theta}\right) = M\ddot\theta,$$

with M representing a constant mass matrix. Combining this representation with $$\frac{\partial}{\partial s}\left(\frac{\partial \mathcal{L}}{\partial \dot\theta}\right) = \frac{\partial \mathcal{L}}{\partial \theta}.$$

results in $M\ddot\theta = -\mathcal{L}'$. While explained in the context of b-splines, the above approach applies to higher dimensional constructs like gradient meshes as well and for linear combination of a set of basis.

To account for a time factor in the physical model such that discrete operations can unify different representations, these equations can be discretized using a forward Euler with a step size of h. A forward Euler can be used to connect the gradient descent and the conceptualizations of energy and mass as applied to vector graphics. The resulting discretized equations can be represented by:

$$\dot\theta = \dot\theta_0 + \Delta\dot\theta;$$

$$\theta = \theta_0 + \Delta\theta;$$

$$\Delta\dot\theta = h(-M^{-1}\mathcal{L}'); \text{ and}$$

$$\Delta\theta = h\dot\theta$$

For a step size of h=1, a term analogous to physical velocity, $\dot\theta_0 = \vec{0}$, can be assigned a value of 0 to simulate a dampening of velocity to 0. Simplifying the above equations provides a unified mesh model, $\Delta\theta = -h^2 M^{-1}\mathcal{L}'$, provides the physical analogy that can compute the stress.

The mesh optimization module can perform reparameterization to the mesh such as adding or subtracting one or more nodes of the mesh (e.g., a discrete operation). Continuing with the example of a b-spline, splitting a node can be represented as multiplying θ by a tall matrix $\vec{A}$. Thus, the new parameterization can be represented as $\theta_{new} = A\theta$.

Due to the differences in representation of θ and $\theta_{new}$, the mesh optimization module can generate one or more additional nodes for θ, however, the θ is constrained to a constant value so that the $\theta_{const}$ can be compared with $\theta_{new}$. In the forward Euler with a step size of h=1, the stress metric can be computed by $$E(x) = \frac{1}{2}x^T M x + h^2 M^{-1}\mathcal{L}'^T x.$$

For the unconstrained optimization, the mesh optimization module can compute $\Delta\theta^* = \text{argmin}_x E(x)$, and the constrained optimization can be computed as $\Delta\theta^*_{const} = A\,\text{argmin}_x E(Ax)$. The respective solutions are $\Delta\theta^* = -M^{-1}\mathcal{L}'$ (unconstrained) and $\Delta\theta^*_{const} = -A(A^T M A)^{-1} A^T \mathcal{L}'$ (constrained). To compute the difference of the stress metrics, the mesh optimization module can compute the difference in the cosine between $\Delta\theta^*_{const}$ and $\Delta\theta^*$.

In another example, the difference in stress metrics can be computed as a squared magnitude of the difference in $\Delta\theta^*_{const}$ and $\Delta\theta^*$. As can be understood from the preceding mathematical explanation, the greater a value of the stress metric, the more beneficial a split at that value improves convergence. In another aspect, candidate locations for additional nodes can be identified by either uniformly sampling along the path or by some form of optimization process. In an example that uses an optimization process to determine locations of the additional nodes, the Hessian of L can be computed. In another aspect, approximate gradients or the use of automatic differentiation can be used.

As illustrated in FIG. 8, the mesh optimization system 800 also includes the storage manager 808. The storage manager 808 maintains data for the mesh optimization system 800. The storage manager 808 can maintain data of any type, size, or kind as necessary to perform the functions of the mesh optimization system 800. The storage manager 808, as shown in FIG. 8, includes the mesh parameters 818. The mesh parameters 818 can include a number of nodes, a placement of nodes, a color definition, or other attributes for each node, and the like, as discussed in additional detail above.

As further illustrated in FIG. 8, the storage manager 808 also includes candidate gradient meshes 820. Candidate gradient meshes 820 can include multiple meshes with varying numbers of nodes, placements, and the like. The storage manager 808 may also include target images 822. The target images may include a digital image in any format. In particular, the target images 822 include digital images that can be represented by a gradient mesh. The storage manager 808 may also include output gradient mesh 824 that are output from the gradient selection engine 806. The output gradient mesh 824 may be stored based on a target image from target images 822 with which the output gradient mesh 824 is associated.

Each of the components 802-808 of the mesh optimization system 800 and their corresponding elements (as shown in FIG. 8) may be in communication with one another using any suitable communication technologies. It will be recognized that although components 802-808 and their corresponding elements are shown to be separate in FIG. 8, any of components 802-808 and their corresponding elements may be combined into fewer components, such as into a single facility or module, divided into more components, or configured into different components that may serve a particular embodiment.

The components 802-808 and their corresponding elements can comprise software, hardware, or both. For example, the components 802-808 and their corresponding elements can comprise one or more instructions stored on a computer-readable storage medium and executable by processors of one or more computing devices. When executed by the one or more processors, the computer-executable instructions of the mesh optimization system 800 can cause a client device and/or a server device to perform the methods described herein. Alternatively, the components 802-808 and their corresponding elements can comprise hardware, such as a special purpose processing device to perform a certain function or group of functions. Additionally, the components 802-808 and their corresponding elements can comprise a combination of computer-executable instructions and hardware.

Furthermore, the components 802-808 of the mesh optimization system 800 may, for example, be implemented as one or more stand-alone applications, as one or more modules of an application, as one or more plug-ins, as one or more library functions or functions that may be called by other applications, and/or as a cloud-computing model. Thus, the components 802-808 of the mesh optimization system 800 may be implemented as a stand-alone application, such as a desktop or mobile application. Furthermore, the components 802-808 of the mesh optimization system 800 may be implemented as one or more web-based applications hosted on a remote server. Alternatively, or additionally, the components of the mesh optimization system 800 may be implemented in a suit of mobile device applications or "apps." To illustrate, the components of the mesh optimization system 800 may be implemented as part of an application, or suite of applications, including but not limited to ADOBE CREATIVE CLOUD, ADOBE PHOTO SHOP, ADOBE ACROBAT, ADOBE ILLUSTRATOR, ADOBE LIGHTROOM and ADOBE INDESIGN. "ADOBE", "CREATIVE CLOUD," "PHOTO SHOP," "ACROBAT," "ILLUSTRATOR," "LIGHTROOM," and "INDESIGN" are either registered trademarks or trademarks of Adobe Inc. in the United States and/or other countries.

Figure 9:
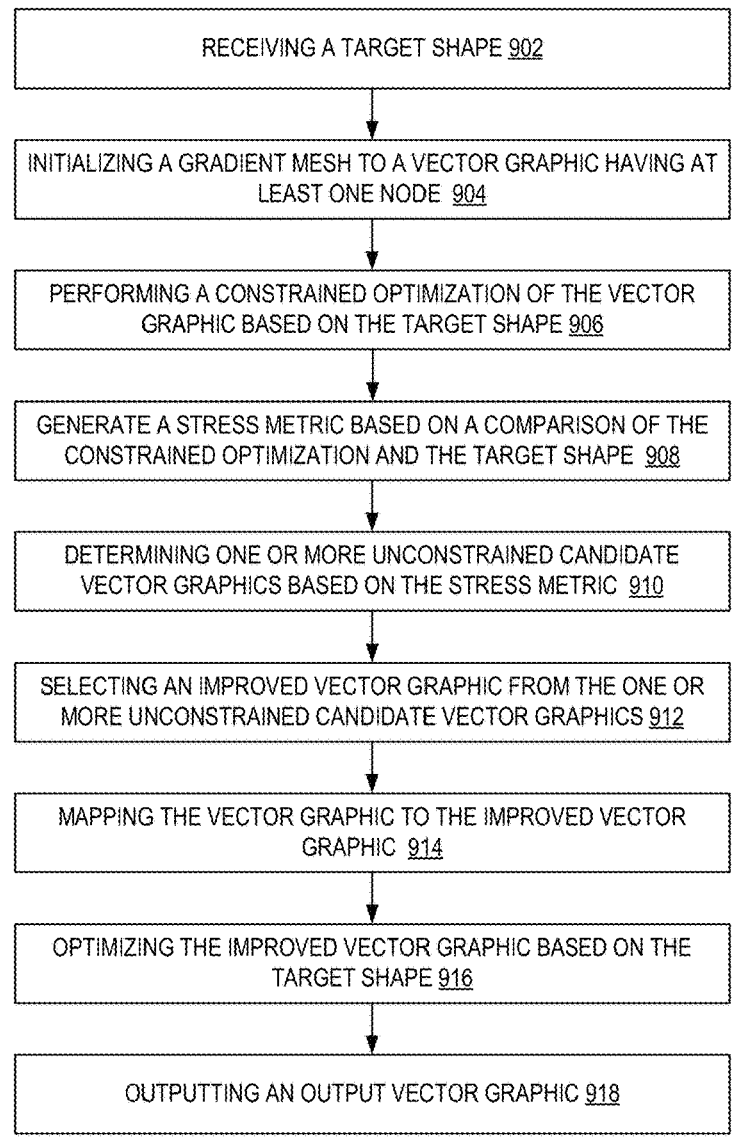
FIG. 9 illustrates a flowchart of a series of acts in a method of continuous optimization of discrete parameters using a unified stress indicator in accordance with one or more embodiments.

FIGS. 1-8, the corresponding text, and the examples, provide a number of different systems and devices that allows a user to perform continuous optimization of vector graphics using discrete operations. In addition to the foregoing, embodiments can also be described in terms of flowcharts comprising acts and steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a method 900 of a series of acts in a method of continuous optimization of a gradient mesh with discrete operations in accordance with one or more embodiments. In one or more embodiments, the method 900 is performed in a digital medium environment that includes the mesh optimization system 800. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving a target shape. The target shape may include a digital image with a plurality of objects, colors, or attributes. The mesh optimization system 800 may receive the target shape via a user interaction with a user interface or can access the target shape in a database of target shapes.

As illustrated in FIG. 9, the method 900 includes an act 904 of initializing a gradient mesh to a vector graphic having at least one node. The mesh optimization system can initialize a gradient mesh with at least one node, a distribution of colors, and other visual attributes.

As illustrated in FIG. 9, the method 900 includes an act 906 of performing a constrained optimization of the vector graphic based on the target shape. As described above, the constrained optimization can be adjusting a location, color, or other attribute of an existing node of the initialized gradient mesh. The constrained optimization does not include a discrete operation such as changing a number of nodes for the initialized gradient mesh.

As illustrated in FIG. 9, the method 900 includes an act 908 of generating a stress metric based on a comparison of the constrained optimization and the target shape. As described above, the stress metric can be computed as an indicator of how accurately the constrained optimization represents the target shape.

As illustrated in FIG. 9, the method 900 includes an act 910 of determining one or more unconstrained candidate vector graphics based on the stress metric. As described above, the mesh optimization module can access a set of candidate meshes that have a different number of nodes than the constrained optimization. The mesh optimization module can determine that applying a discrete operation to the constrained optimization can produce a more accurate gradient mesh. The mesh optimization module can compute and compare a stress metric for the constrained optimization and each of the unconstrained candidate vector graphics to evaluate whether a discrete operation improves the constrained optimization.

As illustrated in FIG. 9, the method 900 includes an act 912 of selecting an improved vector graphic from the one or more unconstrained candidate vector graphics. The mesh optimization module can select the improved vector graphic based on a comparison of the stress metric and the one or more unconstrained candidate vector graphics that represents the target shape more accurately.

As illustrated in FIG. 9, the method 900 includes an act 914 of mapping the vector graphic to the improved vector graphic. The mesh optimization module can perform the discrete operation based on parameters such as a number of nodes of the improved vector graphic to the vector graphic.

As illustrated in FIG. 9, the method 900 includes an act 916 of optimizing the improved vector graphic based on the target shape. The operations of act 916 are substantially similar to the operations and processes of act 906 with respect to the improved vector graphic.

It will be appreciated that the method 900 can iteratively repeat the steps 902-916 any number of times until a threshold stress between the improved vector graphic and the target shape. In some embodiments, other similarity metrics or iteration conditions can be defined as appropriate for the desired output.

As illustrated in FIG. 9, the method 900 includes an act 918 of outputting an output vector graphic. As described above, the mesh optimization module may output an output vector graphic by determining that the stress of the improved vector graphic has a stress metric that is less than a threshold stress.

Figure 10:
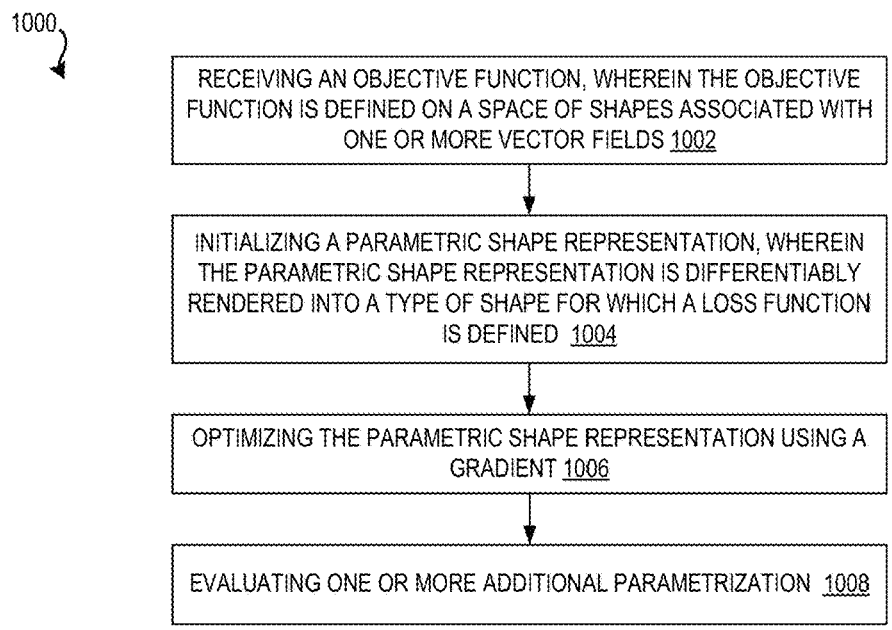
FIG. 10 illustrates a flowchart of a series of acts in a method of evaluating reparameterizations and optimized continuous shape in accordance with one or more embodiments.

FIG. 10 illustrates a flowchart of a series of acts in a method of evaluating reparameterizations and optimized continuous shape in accordance with one or more embodiments. In one or more embodiments, the method 1000 is performed in a digital medium environment that includes the mesh optimization system 800. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving an objective function. For example, the objective function is defined on a space of shapes associated with one or more vector fields. The mesh optimization system 800 may receive the objective function via a user interaction with a user interface. Examples of objective functions can be a binary trace, an arbitrary path, or another type of objective function.

As illustrated in FIG. 10, the method 1000 includes an act 1004 of initializing a parametric shape representation. For instance, the parametric shape representation is differentiably rendered into a type of shape for which a loss function is defined. Examples of the parametric shape representations include but are not limited to a b-spline, a Bezier curve, or another parametric shapes. In some embodiments, the parametric shape representation is a gradient mesh of a vector graphic. The parametric shape representation may be initialized with predetermined, user defined, machine learned, or random attributes of color stops and nodes.

As illustrated in FIG. 10, the method 1000 includes an act 1006 of optimizing the parametric shape representation using a gradient. For instance, as described above, the parametric shape representation may be a patch of gradient mesh defined by a boundary of nodes and one or more lines or curves between each node. The mesh optimization module can reposition or add additional nodes to the parametric shape representation to change the intensity of a color shift or change the extent of a colored area on the object. In some embodiments, a gradient descent may be applied, but other optimization processes may be used.

As illustrated in FIG. 10, the method 1000 includes an act 1008 of evaluating one or more additional parametrizations. As described above, the stress metric can be computed as an indicator of how accurately the constrained optimization represents the target shape. In some embodiments, a machine learning model may be used to predict a likely additional parametrization of the one or more additional parametrizations.

Figure 11:
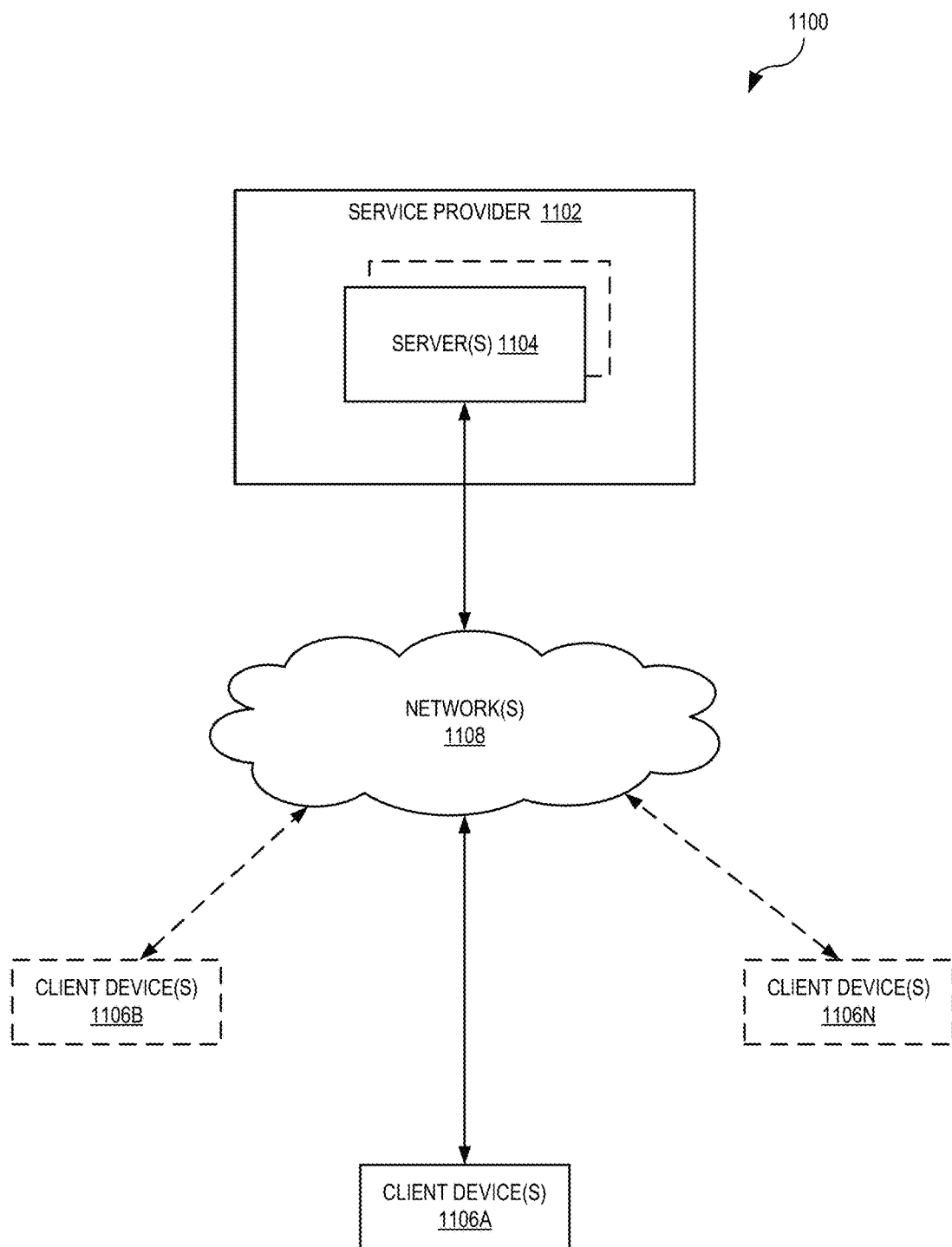
FIG. 11 illustrates a schematic diagram of an exemplary environment in which the image processing system can operate in accordance with one or more embodiments.

FIG. 11 illustrates a schematic diagram of an exemplary environment 1100 in which the mesh optimization system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the mesh optimization system 800. In particular, the mesh optimization system 800 may be implemented in whole or in part on the client device 1102A.

As illustrated in FIG. 11, the environment 1100 may include client devices 1106A-1106N. The client devices 1106A-1106N may comprise of any computing device. For example, client devices 1106A-1106N may comprise one or more personal computers, laptop computers, mobile devices, mobile phones, tablets, special purpose computers, TVs, or other computing devices, including computing devices described below with regards to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regards to FIG. 12.

In addition, the environment 1100 may also include one or more servers 1104. The one or more servers 1104 may generate, store, receive, and transmit any type of data, including mesh parameters 818, target images 822, candidate gradient meshes 820, and output gradient mesh 824, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the mesh optimization system 800. In particular, the mesh optimization system 800 can comprise an application running on the one or more servers 1104 or a portion of the mesh optimization system 800 can be downloaded from the one or more servers 1104. For example, the mesh optimization system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more digital images (e.g., the target images 822, such as camera roll or an individual's personal photos) stored at the one or more servers 1104. Moreover, the client device 1106A can receive a request (i.e., via user input) to generate a gradient mesh representing a target image and provide the request to the one or more servers 1104. Upon receiving the request, the one or more servers 1104 can automatically perform the methods and processes described above to generate an output gradient mesh. The one or more servers 1104 can provide all or portions of output gradient mesh, to the client device 1106A for display to the user.

As just described, the mesh optimization system 800 may be implemented in whole, or in part, by the individual elements 1102-1108 of the environment 1100. It will be appreciated that although certain components of the mesh optimization system 800 are described in the previous examples with regards to particular elements of the environment 1100, various alternative implementations are possible. For instance, in one or more embodiments, the mesh optimization system 800 is implemented on any of the client devices 1106A-N. Similarly, in one or more embodiments, the mesh optimization system 800 may be implemented on the one or more servers 1104. Moreover, different components and functions of the mesh optimization system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
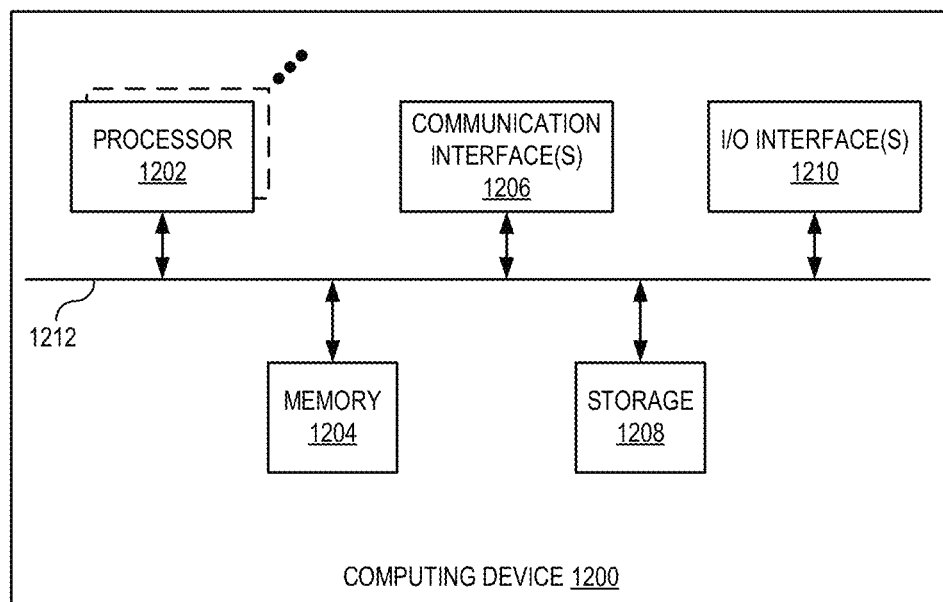
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the image processing system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus can comprise hardware, software, or both that couples components of computing device 1200 to each other.

The computing device 1200 includes a storage device 1208 which includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving a target shape;
initializing a gradient mesh to a vector graphic having at least one node;
performing a constrained optimization of the vector graphic based on the target shape;
generating a stress metric based on a comparison of the constrained optimization and the target shape;
determining one or more unconstrained candidate vector graphics based on the stress metric;
selecting an improved vector graphic from the one or more unconstrained candidate vector graphics;
mapping the vector graphic to the improved vector graphic; and
optimizing the improved vector graphic based on the target shape.

2. The method of claim 1, wherein generating the stress metric comprises computing the stress metric that indicates a similarity of the gradient mesh to the target shape.

3. The method of claim 2, wherein determining one or more unconstrained candidate vector graphics comprises:
computing a stress metric of the one or more unconstrained candidate vector graphics;
computing a difference between the stress metric of the constrained optimization and the stress metric of the one or more unconstrained candidate vector graphics; and
identifying the improved vector graphic based on the difference.

4. The method of claim 3, wherein mapping the vector graphic to the improved vector graphic comprises:
generating additional nodes based on a node difference in a first quantity of nodes of the vector graphic and a second quantity of nodes of the improved vector graphic; and
adjusting a plurality of node connections based on a location of the additional nodes and a location of the at least one node.

5. The method of claim 4, wherein the constrained optimization limits a first set of parameterization parameters to a set of pre-defined values, and wherein the one or more unconstrained candidate vector graphics has a second set of parameterization parameters that are variable based on the additional nodes.

6. The method of claim 1 further comprising presenting the target shape, vector graphic, constrained optimization, and the improved vector graphic to a user via a graphical user interface.

7. The method of claim 1, wherein the target shape is a path defined as a raster image.

8. The method of claim 7, further comprising:
defining a splitting matrix that represents the vector graphic;
generating a constraint matrix from the splitting matrix that constrains a new parameterization of the vector graphic;
dividing the gradient mesh into a first component based on the vector graphic and a second component based on each unconstrained vector graphics of the one or more unconstrained candidate vector graphics; and
converting the first component and the second component into a scalar value that represents a stress value of each unconstrained vector graphic.

9. A non-transitory computer-readable storage medium including instructions stored thereon which, when executed by at least one processor, cause the at least one processor to:
receive a target shape;
initialize a gradient mesh to a vector graphic having at least one node;
perform a constrained optimization of the vector graphic based on the target shape;
generate a stress metric based on a comparison of the constrained optimization and the target shape;
determine one or more unconstrained candidate vector graphics based on the stress metric;
select an improved vector graphic from the one or more unconstrained candidate vector graphics;
map the vector graphic to the improved vector graphic; and
optimize the improved vector graphic based on the target shape.

10. The non-transitory computer-readable storage medium of claim 9, wherein the instructions to generate a stress metric comprise instructions which, when executed by at least one processor, cause the at least one processor to compute a forward Euler of the constrained optimization.

11. The non-transitory computer-readable storage medium of claim 10, wherein the instructions to determine one or more unconstrained candidate vector graphics comprise instructions which, when executed by at least one processor, cause the at least one processor to:

compute a forward Euler of the one or more unconstrained candidate vector graphics;

compute a difference between the forward Euler of the constrained optimization and the forward Euler of the one or more unconstrained candidate vector graphics; and identify the improved vector graphic based on the difference.

12. The non-transitory computer-readable storage medium of claim 9, wherein the instructions to map the vector graphic to the improved vector graphic comprise instructions which, when executed by at least one processor, cause the at least one processor to:

generate additional nodes based on a node difference in a first quantity of nodes of the vector graphic and a second quantity of nodes of the improved vector graphic; and adjust a plurality of node connections based on a location of the additional nodes and a location of the at least one node.

13. The non-transitory computer-readable storage medium of claim 12, wherein the constrained optimization limits a first set of parameterization parameters to a set of pre-defined values, and wherein the one or more unconstrained candidate vector graphics has a second set of parameterization parameters that are variable based on the additional nodes.

14. The non-transitory computer-readable storage medium of claim 9, the instructions further causing the processor to present the target shape, vector graphic, constrained optimization, and the improved vector graphic to a user via a graphical user interface.

15. The non-transitory computer-readable storage medium of claim 9, wherein the target shape is a path defined as a raster image.

16. The non-transitory computer-readable storage medium of claim 9, the instructions further causing the processor to:

define a splitting matrix that represents the vector graphic;

generate a constraint matrix from the splitting matrix that constrains a new parameterization of the vector graphic;

divide the gradient mesh into a first component based on the vector graphic and a second component based on each unconstrained vector graphics of the one or more unconstrained candidate vector graphics; and convert the first component and the second component into a scalar value that represents a stress value of each unconstrained vector graphic.

17. A method comprising:

receiving an objective function, wherein the objective function is defined on a space of shapes associated with one or more vector fields;

initializing a parametric shape representation, wherein the parametric shape representation is differentiably rendered into a type of shape for which a loss function is defined;

optimizing the parametric shape representation using a gradient; and evaluating one or more additional parametrizations, wherein the evaluating comprises:

computing a stress metric from the gradient and one or more constraints for each of the one or more additional parametrizations;

selecting a new parametrization based on the stress metric, wherein the new parametrization has a same shape as the parametric shape representation; and optimizing the new parametrization until the stress metric is less than a threshold stress.

18. The method of claim 17, wherein computing the stress metric comprises determining a similarity of the parametric shape to the objective function.

19. The method of claim 18, wherein selecting a new parametrization based on the stress metric comprises:

computing a stress metric of the new parametrization;

computing a difference between the stress metric of the gradient and the stress metric of the new parametrization; and identifying an improved parametrization based on the difference.

20. The method of claim 17 further comprising:

defining a splitting matrix that represents the objective function;

generating a constraint matrix from the splitting matrix that constrains a new parameterization;

divide the gradient into a first component based on the objective function and a second component based on each new parameterization; and convert the first component and the second component into a scalar value that represents a stress value of each new parameterization.

* * * * *